(12) United States Patent
Hosaka et al.

(10) Patent No.: US 8,852,785 B2
(45) Date of Patent: Oct. 7, 2014

(54) BIPOLAR SECONDARY BATTERY AND METHOD FOR PRODUCING THE SAME

(75) Inventors: Kenji Hosaka, Kanagawa (JP); Motoharu Obika, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 626 days.

(21) Appl. No.: 13/147,323

(22) PCT Filed: Jan. 28, 2010

(86) PCT No.: PCT/JP2010/051083
§ 371 (c)(1),
(2), (4) Date: Aug. 1, 2011

(87) PCT Pub. No.: WO2010/100979
PCT Pub. Date: Sep. 10, 2010

(65) Prior Publication Data
US 2011/0294007 A1 Dec. 1, 2011

(30) Foreign Application Priority Data

Mar. 5, 2009 (JP) ................................. 2009-051557

(51) Int. Cl.
*H01M 2/18* (2006.01)
*H01M 2/14* (2006.01)
*H01M 2/08* (2006.01)

(52) U.S. Cl.
USPC ............................ 429/139; 429/131; 429/185

(58) Field of Classification Search
CPC .............................. H01M 2/08; H01M 2/1673
USPC .......................................... 429/131, 139, 185
See application file for complete search history.

(56) References Cited

U.S. PATENT DOCUMENTS

| 2004/0091771 | A1 | 5/2004 | Hosaka et al. |
| 2005/0019630 | A1* | 1/2005 | Walliser .......................... 429/24 |
| 2008/0220330 | A1 | 9/2008 | Hosaka et al. |
| 2009/0233164 | A1 | 9/2009 | Shimamura et al. |
| 2012/0005882 | A1 | 1/2012 | Shimamura et al. |

FOREIGN PATENT DOCUMENTS

| EP | 1 418 638 A2 | 5/2004 |
| EP | 1 841 001 A1 | 10/2007 |
| JP | 9-232003 A | 9/1997 |

(Continued)

OTHER PUBLICATIONS

Extended European Search Report, Nov. 6, 2013, 5 pages.

*Primary Examiner* — Helen O Conley
(74) *Attorney, Agent, or Firm* — Foley & Lardner LLP

(57) ABSTRACT

A bipolar secondary battery has a battery element that includes first and second bipolar electrodes each having a collector disposed with a conductive resin layer containing a first resin as a base material and positive and negative electrode active material layers formed on opposite sides of the collector and a separator containing a second resin as a base material, arranged between the first and second bipolar electrodes and retaining an electrolyte material to form an electrolyte layer. The positive electrode active material layer of the first bipolar electrode, the electrolyte layer and the negative electrode active material layer of the second bipolar electrode constitute a unit cell. A melting point of the first resin is lower than or equal to a melting point of the second resin. Outer peripheries of the collectors of the first and second bipolar electrodes and an outer periphery of the separator are fused together to thereby seal an outer peripheral portion of the unit cell.

9 Claims, 4 Drawing Sheets

(56) References Cited

FOREIGN PATENT DOCUMENTS

| JP | 2004-185813 A | 7/2004 |
| JP | 2006-190649 A | 7/2006 |
| WO | WO 2006/062204 A1 | 6/2006 |

* cited by examiner

BIPOLAR SECONDARY BATTERY AND METHOD FOR PRODUCING THE SAME

TECHNICAL FIELD

The present invention relates to a bipolar secondary battery in which a seal portion for preventing leakage of an electrolytic solution from a unit cell has good seal durability and a production method thereof.

BACKGROUND ART

In recent years, hybrid electric vehicles (HEV), electric vehicles (EV) and fuel cell vehicles have been manufactured and sold and have been continuously developed from the viewpoint of environmental protection and fuel efficiency improvement. It is essential to make use of chargeable/dischargeable power sources in these so-called electric vehicles. As such power sources, secondary batteries e.g. lithium-ion batteries and nickel-metal-hydride batteries and electric double layer capacitors are used. In particular, the lithium-ion batteries are suitable for use in the electric vehicles because of high energy density and high resistance to repeated charge/discharge cycles. Various developments have been made in the lithium-ion batteries. For use as motor-driving power sources in the vehicles, it is necessary to connect a plurality of secondary batteries in series in order to secure high power output.

When the batteries are connected to each other via connectors, however, the power output of the batteries becomes decreased due to electrical resistance of the connectors. Further, the batteries with the connectors are disadvantageous in terms of space efficiency. That is, the use of the connectors leads to deteriorations in battery output density and energy density.

As a solution to these problems, bipolar secondary batteries such as bipolar lithium-ion secondary batteries have been developed. The bipolar secondary battery has a battery element that includes a plurality of bipolar electrodes, each of which having a collector, a positive electrode active material layer formed on one side of the collector and a negative electrode active material layer formed on the other side of the collector, laminated together via electrolyte layers and separators. It can also be said that the positive electrode active material layer, the electrolyte layer and the negative electrode active material layer constitute one unit cell such that the bipolar secondary battery has a plurality of unit cells are connected in series via the collectors.

In the case of using an electrolyte material containing an electrolytic solution, such as a liquid electrolyte or a polymer gel electrolyte, in the bipolar secondary battery, there arises a problem that the electrolytic solution leaks from the unit cell and causes a liquid junction upon contact with the electrolytic solution of the other unit cell. In order to avoid this problem, Patent Document 1 discloses a bipolar secondary battery in which seal members formed of a polymeric material such as fluorine resin rubber, butyl rubber or silicon rubber are arranged around unit cells so as to seal the unit cells and prevent a liquid junction between the unit cells.

PRIOR ART DOCUMENTS

Patent Documents

Patent Document 1:
Japanese Laid-Open Patent Publication No. H 09-232003

SUMMARY OF THE INVENTION

Problems to be Solved by the Invention

It is desired that the collectors are formed of a more lightweight material for improvement in the output density per unit mass of the bipolar secondary battery. Thus, conductive filler-containing resin materials and conductive polymer materials have been proposed as collector materials alternative to conventional metal foils.

In the case of using collectors containing a resin as a base material, it is necessary to arrange seal members as mentioned above as seal means for sealing the unit cells. Even though the collector and the seal member are thermally fused together, there remains an interface between a surface of the collector and a surface of the seal member. The presence of such an interface between the collector and the seal member makes it likely that the joint surfaces of the collector and the seal member will be separated from each other during repeated battery charge/discharge cycles. This results in a problem that the battery cannot obtain desired seal durability.

Means for Solving the Problems

The present invention was made in view of the above circumstances. It is accordingly an object to provide a bipolar secondary battery in which seal means for sealing unit cells exhibits good seal durability.

The present inventors have made extensive researches to solve the above problems. During the process of the researches, the present inventors have changed the conventional concept that seal members are arrange separately to seal unit cells and come up with the new idea that seal portions can be formed by bonding collectors together. The present inventors have then found that it is possible to achieve a remarkably higher level of seal durability by thermally fusing a pair of opposing collectors to a separator arranged therebetween than by arranging a conventional seal member. The present invention is based on such a finding.

Namely, there is provided according to one aspect of the present invention a bipolar secondary battery, comprising: a battery element, the battery element comprising: first and second bipolar electrodes, each of the first and second bipolar electrodes having a collector disposed with a conductive resin layer, a positive electrode active material layer formed on one side of the collector and a negative electrode active material layer formed on the other side of the collector, the conductive resin layer containing a first resin as a base material; and a separator arranged between the first and second bipolar electrodes and retaining therein an electrolyte material to form an electrolyte layer, the separator containing a second resin as a base material; the positive electrode active material layer of the first bipolar electrode, the electrolyte layer and the negative electrode active material layer of the second bipolar electrode constituting a unit cell, wherein a melting point of the first resin is lower than or equal to a melting point of the second resin; and wherein outer peripheries of the collectors of the first and second bipolar electrodes and an outer periphery of the separator are fused together to thereby seal an outer peripheral portion of the unit cell.

There is provided according to another aspect of the present invention a bipolar secondary battery, comprising: a battery element, the battery element comprising: first and second bipolar electrodes, each of the first and second bipolar electrodes having a collector disposed with a conductive resin layer, a positive electrode active material layer formed on one side of the collector and a negative electrode active material layer formed on the other side of the collector, the conductive resin layer containing a first resin as a base material; and a separator arranged between the first and second bipolar electrodes and retaining therein an electrolyte material to form an electrolyte layer, the separator containing a second resin as a base material; the positive electrode active material layer of the first bipolar electrode, the electrolyte layer and the negative electrode active material layer of the second bipolar electrode constituting a unit cell, wherein the first resin of outer peripheries of the collectors of the first and second bipolar electrodes and the second resin of an outer periphery of the separator are bonded together by intermolecular force to thereby seal an outer peripheral portion of the unit.

There is provided according to still another aspect of the present invention a production method of a bipolar secondary battery, comprising: preparing first and second bipolar electrodes, each of the first and second electrode having a collector disposed with a conductive resin layer, a positive electrode active material layer formed on one side of the collector and a negative electrode active material layer formed on the other side of the collector; preparing a separator containing a resin as a base material; laminating the first and second bipolar electrodes on the separator in such a manner that the positive electrode active material layer of the first bipolar electrode faces the negative electrode active material layer of the second bipolar electrode via the separator; charging an electrolyte material into the separator to form an electrolyte layer so that the positive electrode active material layer of the first bipolar electrode, the electrolyte layer and the negative electrode active material layer of the second bipolar electrode constitute a unit cell; and hot pressing an outer peripheral portion of the unit cell, thereby fusing outer peripheries of the collectors of the first and second bipolar electrodes to an outer periphery of the separator.

DETAILED DESCRIPTION

Figure 1:
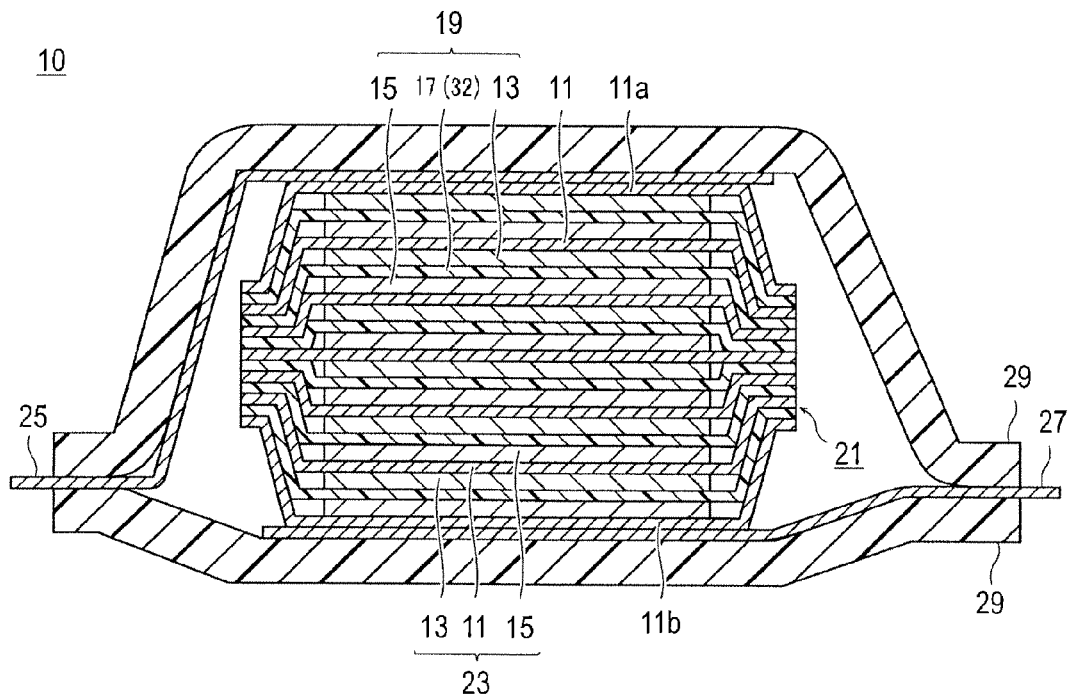
FIG. 1 is a schematic section view of a bipolar secondary battery according to one embodiment of the present invention.

Exemplary embodiments of the present invention will be described in detail below with reference to the drawings. It should be herein noted that the scope of the present invention is defined based on the claims and is not limited to the following embodiments. In the drawings, like parts and portions are designated by like reference numerals to omit repeated explanations thereof. Further, the dimensions of the respective parts and portions may be exaggerated for purposes of illustration in the drawings and may be different from the actual dimensions.

[Bipolar Secondary Battery]

Figure 2:
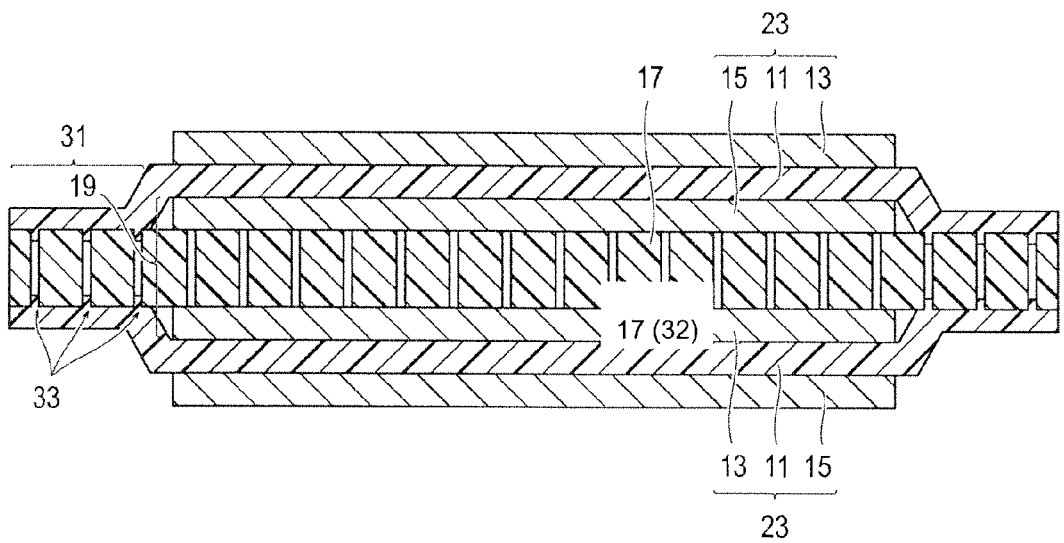
FIG. 2 is a schematic section view of unit cell seal means of the bipolar secondary battery according to the one embodiment of the present invention.

FIG. 1 is a schematic section view showing the overall structure of bipolar secondary battery 10 according to one embodiment of the present invention. FIG. 2 is an enlarged section view of part of bipolar secondary battery 10. Bipolar secondary battery 10 has substantially rectangular battery element 21, which actually undergoes a charge/discharge reaction, sealed in a battery package of laminate film 29.

Battery element 21 includes a plurality of bipolar electrodes 23 each having collector 11, positive electrode active material layer 13 electrically connected to one side of collector 11 and negative electrode active material layer 15 electrically connected to the other side of collector 11 and a plurality of separators 32 each retaining an electrolyte material in a planar center portion thereof to form electrolyte layer 17. In the present embodiment, collector 11 has a conductive resin layer that contains a first resin as a base material; and separator 32 contains a second resin as a base material. (The details of these structural parts will be explained later.)

Bipolar electrodes 23 and separators 32 are alternately laminated on each other in such a manner that positive electrode active material layer 13 of either one of bipolar electrodes 23 faces negative electrode active material layer 15 of any other one of bipolar electrodes 23 adjacent to the aforementioned either one of bipolar electrodes 23 via electrolyte layer 17. Namely, electrolyte layer 17 is arranged between positive electrode active material layer 13 of the either one of bipolar electrodes 23 and negative electrode active material layer 15 of the any other one of bipolar electrodes 23 adjacent to the aforementioned either one of bipolar electrodes 23. These adjacently located positive electrode active material layer 13, electrolyte layer 17 and negative electrode active material layer 15 constitute one unit cell 19. It can be thus said that bipolar secondary battery 10 has a laminated structures of unit cells 19. Outermost collector 11a is located as a positive-electrode-side outermost layer of battery element 21. Positive electrode active material layer 13 is formed only on one side of outermost collector 11a. Further, outermost collector 11b is located as a negative-electrode-side outermost layer of battery element 21. Negative electrode active material layer 15 is formed only on one side of outermost collector 11b. Alternatively, positive electrode active material layers 13 may be formed on both sides of positive-electrode-side outermost collector 11a; and negative electrode active material layer 15 may be formed on both sides of negative-electrode-side outermost collector 11b.

Bipolar secondary battery 10 also has a positive electrode collector plate 25 located adjacent to positive-electrode-side outermost collector 11a and led out from laminate film 29 and a negative electrode collector plate 27 located adjacent to negative-electrode-side outermost collector 11b and led out from laminate film 29.

The number of lamination of unit cells 19 is adjusted depending on the desired battery voltage. It is feasible to decrease the number of lamination of unit cells 19 and thereby reduce the thickness of bipolar secondary battery 10 as long as bipolar secondary battery 10 can secure sufficient output. In bipolar secondary battery 10, battery element 21 is preferably vacuum-sealed in laminate film 29, with some portions of positive and negative electrode collector plates 25 and 27 led out of laminate film 29, in order to protect battery element 21 from external impact and environmental deterioration during use.

In the present embodiment, outer peripheries of collectors 11 of two adjacent bipolar electrodes 23 are bonded by thermal fusion to an outer periphery of separator 32 so as to thereby seal outer peripheral portion 31 of unit cell 19 as shown in FIG. 2. This seal portion has the effect of anchoring collectors 11 to separator 32 as the first resin contained as the base material in collector 11 melts, flows in and gets cured within fine pores 33 of separator 32 during thermal fusion. In such thermal fusion bonding, the molecule of the first resin of collectors 11 is bonded to the molecule of the second resin of separator 32 by intermolecular force so that there is no interface formed between the outer periphery of collector 11 and the outer periphery of separator 32. The strength of bonding between collector 11 and separator 32 can be thus increased for good seal durability. The formation of such seal mean for unit cell 19 makes it possible to prevent an electrolytic solution from leaking from unit cell 19 and causing a short circuit by an electrolytic solution leaking from unit cell 19 and coming into contact with that of other unit cell 19 and also makes it possible to prevent contact between adjacent collectors 11 in battery 10 and short circuit due to slight variations between ends of unit cells 19 in battery element 21. Therefore, the sealing means of the present embodiment provides bipolar secondary battery 10 with long-term reliability and safety and high quality.

Although bipolar secondary battery 10 has a substantially rectangular laminated (flat) battery structure in the present embodiment, the structure of bipolar secondary battery 10 is not particularly limited. Bipolar secondary battery 10 may have any other known structure such as winding (cylindrical) battery structure. The form of bipolar secondary battery 10 is not also particularly limited. Bipolar secondary battery 10 can be in the form of a lithium-ion secondary battery, a sodium-ion secondary battery, a potassium-ion secondary battery, a nickel-metal-hydride secondary battery, a nickel-cadmium secondary battery, a nickel-metal-hydride battery or the like. Bipolar secondary battery 10 is preferably a lithium-ion secondary battery in order to increase the voltage of the electric cell (unit cell 19) and attain high energy density and high output density.

The main structural parts of bipolar secondary battery 10 will be described in more detail below.

[Bipolar Electrode]

Bipolar electrode 23 has collector 11, positive electrode active material layer 13 formed on one side of collector 11 and negative electrode active material layer 15 formed on the other side of collector 11.

(Collector)

Collector 11 functions as a medium of transferring electrons from one side abutting positive electrode active material layer 13 to the other side abutting negative electrode active material layer 15. In the present embodiment, collector 11 has at least one conductive resin layer and may have any other layer as needed. The conductive resin layer, which is an essential component of collector 11, functions as electron transfer medium and contributes to collector weight reduction. This conductive resin layer contains a first resin as a base material and may contain any other material such as a conductive filler as needed.

There is no particular limitation on the first resin used as the base material. Any known nonconductive polymer material or conductive polymer material can be used as the first resin without limitation. Suitable examples of the nonconductive polymer material are polyethylene (PE; high-density polyethylene (HDPE), low-density polyethylene (LDPE)), polypropylene (PP), polyethylene terephthalate (PET), polyether nitrile (PEN), polyimide (PI), polyamideimide (PAI), polyamide (PA), polytetrafluoroethylene (PTFE), styrene-butadiene rubber (SBR), polyacrylonitrile (PAN), polymethylacrylate (PMA), polymethylmethacrylate (PMMA), polyvinyl chloride (PVC), polyvinylidene fluoride (PVdF) and polystyrene (PS). These nonconductive polymer materials show high potential resistance and solvent resistance. There can also suitably be used thermosetting resins such as phenol resin, epoxy resin, melamine resin, urea resin and alkyd resin. Suitable examples of the conductive polymer material are polyaniline, polypyrrole, polythiophene, polyacetylene, polyparaphenylene, polyphenylene vinylene, polyacrylonitrile and polyoxadiazole. These conductive polymer materials show sufficient conductivity without the addition of a conductive filler and thus are advantageous in terms of production process simplification and collector weight reduction. The above nonconductive and conductive polymer resins can be used solely or in the form of a mixture of two or more thereof.

Among others, it is preferable to use a thermoplastic resin for easy fusion bonding of collectors 11 and separator 32. As the thermoplastic resin can easily melt under heat, the use of such a thermoplastic resin allows easy sealing of unit cell 19 by hot pressing etc.

In order for the resin layer to secure conductivity, a conductive filler is added to the base material as needed. Especially when the nonconductive polymer material is used as the first resin, it is necessary to add the conductive filler in order to impart conductivity to the first resin. There is no particular limitation on the conductive filler as long as it is a conductive material. A metal material and a conductive carbon material can be used as the conductive material having good conductivity and high potential resistance and, in the case where bipolar secondary battery 10 is a lithium-ion battery, showing lithium-ion shielding properties.

There is no particular limitation on the metal material. Preferably, the metal material contains at least one kind of metal selected from the group consisting of Ni, Ti, Al, Cu, Pt, Fe, Cr, Sn, Zn, In, Sb and K, or an alloy or oxide thereof. These metal materials show resistance to positive or negative electrode potential at collector surface. More preferably, the metal material is an alloy containing at least one kind of metal selected from the group consisting from Ni, Ti, Al, Cu, Pt, Fe and Cr.

Specific examples of the alloy are stainless steel (SUS), Inconel (trademark), Hastelloy (trademark), and other Fe—Cr and Ni—Cr alloys. The use of these alloys makes it possible that the resin layer can attain higher potential resistance.

There is also no particular limitation on the conductive carbon material. Preferably, the conductive carbon material contains at least one kind selected from the group consisting of acetylene black, Vulcan carbon, Black Pearl, carbon nanofiber, Ketjen Black, carbon nanotube, carbon nanohorn, carbon nanoballoon and fullerene. These conductive carbon materials show a very wide potential window so as to be stable to a wide range of positive and negative potentials and also show good conductivity. The above conductive fillers such as metal materials and conductive carbon materials can be used solely or in combination of two or more thereof.

The form of the conductive filler is not particularly limited and is selected as appropriate. The conductive filler can in any known form such as particle form, fiber form, plate form, massive form, cloth form, mesh form etc. In the case of imparting conductivity to a wide area of the resin, it is preferable to use the conductive filler in particle form. On the other hand, it is preferable to use the conductive filler in the form of having a certain directional property e.g. in fiber form in the case of increasing the conductivity of the resin in a specific direction.

The size of the conductive filler is not also particularly limited. The conductive filler can be of various size depending on the size and thickness of the resin layer and the form of the conductive filler. In the case where the conductive filler is in particle form, the average particle size of the conductive filler is preferably of the order of about 0.1 to 10 μm in terms of ease of molding of the resin layer. In the present specification, the term "particle size" refers to a maximum distance L between any two points on the contour of a conductive filler particle. The term "average particle size" refers to an average of the particle sizes of conductive filler particles observed in several to several ten fields by observation means such as scanning electron microscope (SEM) or transmission electron microscope (TEM). The same definitions apply to the particle size and average particle size of the active materials as will be mentioned later.

Further, there is no particular limitation on the amount of the conductive filler added to the resin layer. The conductive filler is not necessarily added to the resin in the case where the resin contains conductive polymer material and can secure sufficient conductivity. It is however necessary to add the conductive filler and thereby impart conductivity to the resin in the case where the resin consists only of nonconductive polymer material. In this case, the amount of the conductive filler added is preferably 5 to 35 mass %, more preferably 5 to 25 mass %, still more preferably 5 to 15 mass %, based on the total mass of the nonconductive polymer material. The addition of such an amount of conductive filler to the resin makes it possible to impart sufficient conductivity to the nonconductive polymer material while preventing mass increase in the resin layer.

There is no particular limitation on the distribution of the conductive filler in the resin layer. The conductive filler may be uniformly dispersed or partially localized in the resin base material. In the case of imparting uniform conductivity over the resin layer, it is preferable to disperse the conductive filler uniformly throughout the resin. As outer peripheral portion 31 of unit cell 19 is sealed by fusion bonding of the outer peripheries of collectors 11 and separator 32 in the present embodiment, it is also effective that the conductive filler is not added to the outer peripheries of collectors 11 corresponding to such a seal portion but is added to only portions of collectors 11 on which active material layers 13 and 15 are formed. This makes it possible to prevent short circuit between collectors 11 in the seal portion and increase the seal durability of the seal portion to a higher level.

The thickness of the conductive resin layer alone is preferably 1 to 200 μm, more preferably 10 to 100 μm, still more preferably 10 to 50 μm. When the thickness of the resin layer is in the above range, the resistance of the resin layer in a thickness direction thereof can be limited to a sufficiently low level. This makes it possible to, in addition to securing the conductivity of collector 11, improve the output density of battery 10 by weight reduction. This also makes it possible to improve the life and vibration resistance characteristics of battery 10 by liquid junction reduction.

There is no particular limitation on the structure of collector 11. Collector 11 can be of any structure as long as the conductive resin layer is contained in collector 11. Collector 11 may have a laminated structure including any other layer as needed in addition to the resin layer. Examples of the layer other than the resin layer are, but are not limited to, a metal layer and an adhesive layer. Needless to say, it is essential that the conductive resin layer is present at a surface of collector 11 in the present embodiment.

It is desirable that the thickness of collector 11 is smaller for improvement in battery output density by weight reduction. In bipolar secondary battery 10, the thickness of collector 11 can be decreased as there would be no problem even when the electrical resistance of collector 11 between positive and negative electrode active material layers 13 and 15 in bipolar electrode 23 is high in a direction horizontal to a lamination direction. In particular, the thickness of collector 11 is preferably 1 to 200 μm, more preferably 5 to 150 μm, still more preferably 10 to 100 μm. When the thickness of the collector 11 is in the above range, it is possible that bipolar secondary battery 10 can attain good output characteristics and long-term reliability.

(Positive Electrode Active Material Layer)

Positive electrode active material layer 13 contains a positive electrode active material. The positive electrode active material has a composition for absorbing ions during discharging and releasing ions during charging. In the case where bipolar secondary battery 10 is a lithium-ion secondary battery, a lithium-transition metal composite oxide, i.e., a composite oxide of lithium and transition metal can be preferably used as the positive electrode active material. Specific examples of the lithium-transition metal composite oxide are: Li—Co composite oxides such as $LiCoO_2$; Li—Ni composite oxides such as $LiNiO_2$; Li—Mn composite oxides such as spinel $LiMn_2O_4$; Li—Fe composite oxides such as $LiFeO_2$; and those obtained by replacing parts of transition metal elements of the lithium-transition metal composite oxides with other elements. As the lithium-transition metal composite oxide shows good reactivity and cycle performance and is available at low cost, the use of such a lithium-transition metal composite oxide as the positive electrode active material of bipolar electrode 23 makes it possible that battery 10 can attain good output characteristics. There can also suitably be used as the positive electrode active material: lithium-transition metal phosphate or sulfate compounds such as $LiFePO_4$; transition metal oxides or sulfides such as $V_2O_5$, $MnO_2$, $TiS_2$, $MoS_2$ and $MoO_3$; $PbO_2$; AgO; NiOOH and the like. The above positive electrode active materials can be used solely or in the form of a mixture of two or more thereof.

The average particle size of the positive electrode active material is not particularly limited. In terms of high capacity, reactivity and cycle performance, the average particle size of the positive electrode active material is preferably 1 to 100 μm, more preferably 1 to 20 μm. When the average particle size of the positive electrode active material is in the above range, it is possible to limit increase in the internal resistance of secondary battery 10 during charging/discharging under high-output conditions and take out sufficient electric current from secondary battery 10, In the case where the positive electrode active material is in the form of secondary particles, the average particle size of primary particles in these secondary particles is preferably 10 nm to 1 μm. The average particle size of the primary particles is not however necessarily limited to the above range in the present embodiment. Needless to say, the positive electrode active material is not necessarily in secondary particle form such as aggregate form or massive form although it depends on the production process. The particle size of the positive electrode active material and the particle size of the primary particles can be each given in the unit of a median diameter as measured by laser diffraction. The form of the positive electrode active material varies depending on the kind and production process of the positive electrode active material. The positive electrode active material can be in, but not limited to, spherical (powder) form, plate form, needle form, columnar form, horn form or the like, and can be used in any form without problem. It is desirable to select the optimal form of the positive electrode active material as appropriate for improvement in charging/discharging battery performance.

(Negative Electrode Active Material Layer)

Negative electrode active material layer 15 contains a negative electrode active material. The negative electrode active material has a composition for releasing ions during discharging and absorbing ions during charging. In the case where bipolar secondary battery 10 is a lithium-ion secondary battery, there is no particular limitation on the negative electrode active material as long as it is capable of reversibly absorbing and releasing lithium. Preferable examples of the negative electrode active material are: metals such as Si and Sn; metal oxides such as TiO, $Ti_2O_3$, $TiO_2$, $SiO_2$, SiO and $SnO_2$; lithium-transition metal composite oxides such as $Li_{4/3}Ti_{5/3}O_4$ and $Li_7MnN$; Li—Pb alloy; Li—Al alloy; Li; and carbon materials such as natural graphite, artificial graphite, carbon black, activated carbon, carbon fiber, coke, soft carbon and hard carbon. It is preferable that the negative electrode active material contains an element capable of alloying with lithium so that battery 10 can achieve higher energy density than those using conventional carbon materials and can attain high capacity and good output characteristics. The above negative electrode active materials can be used solely or in the form of a mixture of two or more thereof.

There is no particular limitation on the element capable of alloying with lithium. Specific examples of such an element are Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te and Cl. Preferably, the negative electrode active material contains a carbon material and/or at least one element selected from the group consisting of Si, Ge, Sn, Pb, Al, In and Zn for high capacity and energy density of battery 10. It is particularly preferable that the negative electrode active material contains a carbon material, Si or Sn. These elements can be used solely or in combination of two or more thereof.

The average particle size of the negative electrode active material is not particularly limited. In terms of high capacity, reactivity and cycle performance, the average particle size of the negative electrode active material is preferably 1 to 100 µm, more preferably 1 to 20 µm. When the average particle size of the negative electrode active material is in the above range, it is possible to limit increase in the internal resistance of secondary battery 10 during charging/discharging under high-output conditions and take out sufficient electric current from secondary battery 10. In the case where the negative electrode active material is in the form of secondary particles, the average particle size of primary particles in these secondary particles is preferably 10 nm to 1 µm. The average particle size of the primary particles is not however necessarily limited to the above range in the present embodiment. Needless to say, the negative electrode active material is not necessarily in secondary particle form such as aggregate form or massive form although it depends on the production process. The particle size of the negative electrode active material and the particle size of the primary particles can be each given in the unit of a median diameter as measured by laser diffraction. The form of the negative electrode active material varies depending on the kind and production process of the negative electrode active material. The negative electrode active material can be in, but not limited to, spherical (powder) form, plate form, needle form, columnar form, horn form or the like, and can be used in any form without problem. It is desirable to select the optimal form of the negative electrode active material as appropriate for improvement in charging/discharging battery performance.

Each of active material layers 13 and 15 may contain any other material such as a conduction aid, a binder etc. as needed. In the case where an ion conductive polymer is used, a polymerization initiator may be contained for polymerization of the polymer.

The conduction aid is an additive to improve the conductivity of active material layer 13, 15. Examples of the conduction aid are: carbon powders such as acetylene black, carbon black and Ketjen Black; carbon fibers such as vapor grown carbon fiber (VGCF; trademark); and expandable graphite. The conduction aid is not however limited to these materials.

Examples of the binder are polyvinylidene fluoride (PVdF), polyimide, PTFE, SBR and synthetic rubber binder. The binder is not however limited to these materials. It is not necessary to use the binder when the binder is the same material as the matrix polymer of the gel electrolyte.

The component ratio of active material layer 13, 15 is not particularly limited and is adjusted as appropriate in the light of any knowledge about secondary batteries. The thickness of active material layer 13, 15 is not also particularly limited and is adjusted in the light of any knowledge about secondary batteries. For example, the thickness of active material layer 13, 15 can be preferably set to about 10 to 100 µm, more preferably 20 to 50 µm. When the thickness of active material layer 13, 15 is about 10 µm or more, it is possible to secure sufficient battery capacity. On the other hand, it is possible to prevent increase in the internal resistance of the battery due to the difficulty of diffusion of lithium ions to the electrode center (collector side) when the thickness of active material layer 13, 15 is about 100 µm or less.

There is no particular limitation of the process of formation of active material layer 13, 15 on the surface of collector 11. Each of active material layers 13 and 15 can be formed on collector 11 by any known process.

One example of the active material layer formation process is as follows. First, an active material slurry is prepared by dispersing and dissolving the active material and, when needed, the electrolytic salt for improvement in ion conductivity, the conduction aid for improvement in electronic conductivity, the binder etc. as mentioned above, into a suitable solvent. The solvent is not particularly limited. There can be used as the solvent N-methyl-2-pyrrolidone (NMP), dimethylformamide, dimethylacetoamide, methylformamide, cyclohexane, hexane etc. without particular limitation. In the case of using polyvinylidene fluoride (PVdF) as the binder, NMP can suitably be used as the solvent. The prepared active material slurry is applied to collector 11, dried to remove the solvent and pressed, thereby forming active material layer 13, 15 on collector 11. At this time, the porosity of active material layer 13, 15 can be controlled by adjusting the press conditions.

The press means is not particularly limited and is selected as appropriate so as to control the porosity of active material layer 13, 15 to a desired level. As the press means, a hot press machine, a calender roll machine and the like are usable. The press conditions (such as temperature and pressure) are not also particularly limited and are set as appropriate in the light of any conventional knowledge.

[Electrolyte Layer]

Electrolyte layer 17 functions as a medium of transferring lithium ions between electrodes. There is no particular limitation on the electrolyte material of the electrolyte layer 17 as long as the electrolyte material includes an electrolytic solution containing a solvent. Any known liquid electrolyte or polymer gel electrolyte can be used as the electrolyte material. In the case where bipolar secondary battery 10 is a lithium-ion secondary battery, the following liquid electrolyte or polymer gel electrolyte can preferably be used.

The liquid electrolyte is one in which a lithium salt as a support salt is dissolved in a solvent. Examples of the solvent are dimethyl carbonate (DMC), diethyl carbonate (DEC), dipropyl carbonate (DPC), ethyl methyl carbonate (EMC), methyl propionate (MP), methyl acetate (MA), methyl formate (MF), 4-methyldioxolane (4MeDOL), dioxolane (DOL), 2-methyltetrahydrofuran (2MeTHF), tetrahydrofuran (THF), dimethoxyethane (DME), ethylene carbonate (EC), propylene carbonate (PC), butylene carbonate (BC) and γ-butyrolactone (GBL). These solvents can be used solely or in the form of a mixture of two or more thereof.

The support salt (lithium salt) is not particularly limited. Examples of the support salt are: inorganic acid anion salts such as $LiPF_6$, $LiBF_4$, $LiClO_4$, $LiAsF_6$, $LiTaF_6$, $LiSbF_6$, $LiAlCl_4$, $Li_2B_{10}Cl_{10}$, LiI, LiBr, LiCl, LiAlCl, $LiHF_2$ and LiSCN; and organic acid anion salts such as $LiCF_3SO_3$, $Li(CF_3SO_2)_2N$, LiBOB (lithium bis(oxalate)borate) and LiBETI (lithium bis(perfluoroethylene)sulfonylfluoride, also represented as $Li(C_2F_5SO_2)_2N$). These electrolytic salts can be used solely or in the form of a mixture of two or more thereof.

On the other hand, the polymer gel electrolyte is one in which the above liquid electrolyte is impregnated into a lithium-ion-conductive matrix polymer. Examples of the lithium-ion-conductive matrix polymer are: polymer having in a main chain or side chain thereof polyethylene oxide (PEO); polymer having in a main chain or side chain thereof polypropylene oxide (PPO); polyethylene glycol (PEG); polyacrylonitrile (PAN); polymethacrylic acid ester; polyvinylidene fluoride (PVdF); polyvinylidene fluoride-hexafluoropropylene copolymer (PVdF-HFP); polyacrylonitrile (PAN); poly(methylacrylate) (PMA); and poly(methylmethacrylate) (PMMA). The above polymers can be used in the form of a mixture, modification, derivative, random copolymer, alternate copolymer, graft copolymer or block copolymer thereof. Among others, PEO, PPO, copolymers thereof, PVdF and PVdF-HFP are preferred. In these matrix polymers, the electrolytic salt such as lithium salt can be dissolved well. Further, these matrix polymers can provide good mechanical strength by formation of a cross-linking structure.

[Separator]

Separator 32 has the function of retaining therein the electrolyte material and contains a second resin as a base material. In the present embodiment, separator 32 is an essential component as the seal mean for unit cell 19 is formed by fusion bonding of collectors 11 and separator 32. The second resin contained as the base material in separator 32 needs to be a nonconductive polymer material in order to ensure insulation between collectors 11. As the second resin, the same nonconductive polymer materials as those explained above as the first resin contained as the base material in collector 11 can suitably be used without particular limitation.

There is no particular limitation on the form of separator 32. Separator 32 can be in the form of a porous membrane (porous film) with a plurality of fine pores, a nonwoven fabric or a laminate thereof. There can also be used a composite resin membrane that has a polyolefin nonwoven fabric or polyolefin porous film as a reinforcement layer and vinylidene fluoride filled in the reinforcement layer.

In the present embodiment, it is essential that a melting point of the first resin contained as the base material in collector 11 is lower than or equal to a melting point of the second resin contained as the base material in separator 32. By satisfaction of this condition, the first resin contained as the base material in collector 11 melts, flows into fine pores 33 in the surface of separator 32, gets cured within these fine pores 33 and thereby becomes adhered to the surface of separator 32 during the thermal fusion bonding of collector 11 and separator 32. It is thus possible to obtain the anchoring effect for developing remarkable adhesion between collector 11 and separator 32 by embedding a part of the resin of collector 11 into pores 33 of separator 32. The melting point of the first resin is preferably 20° C. or more, more preferably 50° C. or more, lower than the melting point of the second resin.

Preferable combinations of the first and second resins are as follows. The first resin preferably contains at least one kind selected from the group consisting of polyolefins such as polyethylene (melting point: 110 to 130° C.) and polypropylene (melting point: 160 to 170° C.). The second resin preferably contains at least one kind selected from the group consisting of: polyolefins such as polyethylene (melting point: 110 to 130° C.) and polypropylene (melting point: 160 to 170° C.); polyesters such as polyethylene terephthalate (melting point: 250 to 260° C.) and polyether nitrile (melting point: 269° C.); thermoplastic imide (melting point: 380° C.); polyamide (melting point: 176 to 275° C.); and polyvinylidene fluoride (melting point: 134 to 169° C.). It is possible to obtain further improvement in seal reliability by selection of the first and second resins from these resin materials.

A thermosetting resin that does not melt by heat, such as phenol resin, epoxy resin, melamine resin, urea resin, alkyd resin and the like is also preferably used as the second resin as the melting point of the first resin is lower than or equal to the melting point of the second resin. The use of such a thermosetting resin as the second resin makes it possible to avoid melting of the second resin during hot pressing etc. and secure insulation between two collectors 11.

In the seal means of the present embodiment, the seal portion for sealing unit cell 19 is formed by fusion bonding of collectors 11 and separator 32 without using a seal member that has been used as conventional seal means. Although the resin of collector 11 melts and flows in pores 33 of separator 32, the viscosity of such a melted resin is high so that the melted resin is not completely embedded into pores 33 of separator 32. It is possible in the case using e.g. a tine porous film separator as separator 32 to avoid the occurrence of seal leak as the tine porous film separator has through holes in a vertical direction but does not have a pore passage in a planar direction.

The conventional seal member plays a role in not only bonding the collectors to each other and to the separator but also preventing, as an insulation layer, short circuit between the collectors. As a matter of course, the seal means of the present embodiment also has the function of preventing short circuit between two collectors 11. The melted resin of collector 11 is high in viscosity and thus, in general, is not completely embedded into pores 33 of separator 32 as mentioned above so that there would occur no short circuit between collectors 11 inside pores 33. It is however conceivable to adopt the following techniques as a measure to prevent such short circuit more strictly.

The first technique for short circuit prevention is to adjust the conditions of the fusion bonding of collectors 11 and separator 32 as appropriate and, more specifically, to adjust the temperature, pressure and time of the hot press process in such a manner that collectors 11 do not come into contact with each other inside pores 33 of separator 32. In the present embodiment, the excessive hot press conditions are unfavorable due to the reason that it is possible to obtain a sufficient anchoring effect and thereby achieve a desired level of seal durability when only a small amount of the resin of collector 11 is embedded in pores 33 of separator 32. The hot press conditions depend on the thicknesses of the structural parts and the number of lamination of the structural parts and cannot be generalized. For example, the hot press conditions are preferably a pressure of 0.1 to 0.5 Mpa, a temperature of 130 to 180° C. and a time of the order of 3 to 20 seconds in the case of using polyethylene as the base materials of collector 11 and separator 32.

The second technique for short circuit prevention is that, in the case of adding the conductive filler to the conductive resin layer of collector 11, the conductive filler is not added to the seal portion of the resin layer.

The third technique for short circuit prevention is to, in the case of adding the conductive filler to the conductive resin layer of collector 11, control the particle size of the conductive filler to be larger than the pore size of separator 32. As the pore size of separator 32 is generally of the order of 100 to 1000 nm, the average particle size of the conductive filler is preferably controlled to be of the order of 500 to 5000 nm.

Although the techniques for short circuit prevention between collectors 11 in the seal means of the present embodiment has been described above, the measure to prevent short circuit between collector 11 are not limited to the above techniques and can be modified, omitted or added as appropriate.

[Battery Package]

In the present embodiment, laminate film 29 is suitably used as the battery package because of its high output and cooling characteristics and applicability to large-equipment batteries such as EV and HEV batteries. Examples of laminate film 29 are aluminum laminate films such as a three-layer laminate film in which a polypropylene layer, an aluminum layer and a nylon layer are laminated in this order. Laminate film 29 is formed into e.g. a bag-shaped case so as to cover battery element 21. The form of laminate film 29 is not however limited to the above. As the battery package, there can alternatively be used a known metal can.

[Production Method of Bipolar Secondary Battery]

There is no particular limitation on the production method of bipolar secondary battery 10. For example, bipolar secondary battery 10 can be produced by the following steps: a step of preparing bipolar electrodes 23 and separators 32 individually; a step of laminating bipolar electrodes 23 and separators 32 on each other in such a manner that positive electrode active material layer 13 of one of bipolar electrodes 23 faces negative electrode active material layer 15 of any other one of bipolar electrodes 23 adjacent to the aforementioned one of bipolar electrodes 23 via separator 32; a step of charging the electrolyte material in separators 32 to form electrolyte layers 17; and a step of hot pressing the outer peripheral portions of unit cells 19 (battery element 21) and thereby fusion bonding the outer peripheries of collectors 11 to the outer peripheries of separators 32. For higher production efficiency, it is herein feasible to hot press three sides of the outer peripheral portions of the unit cells 19 (battery element 21) to thereby fuse the corresponding areas of the outer peripheries of collectors 11 and separators 32, charge the electrolyte material in separators 32, and then, hot press the other one side of the outer peripheral portions of unit cells 19 (battery element 21) to thereby fuse the remaining areas of the outer peripheries of collectors 11 and separators 32.

[Battery Assembly]

A battery assembly is manufactured by electrically connecting bipolar secondary batteries 10 in series and/or in parallel in the present embodiment. The capacity and voltage of the battery assembly is adjusted freely by serial or parallel connection of bipolar batteries 10.

Figure 3:
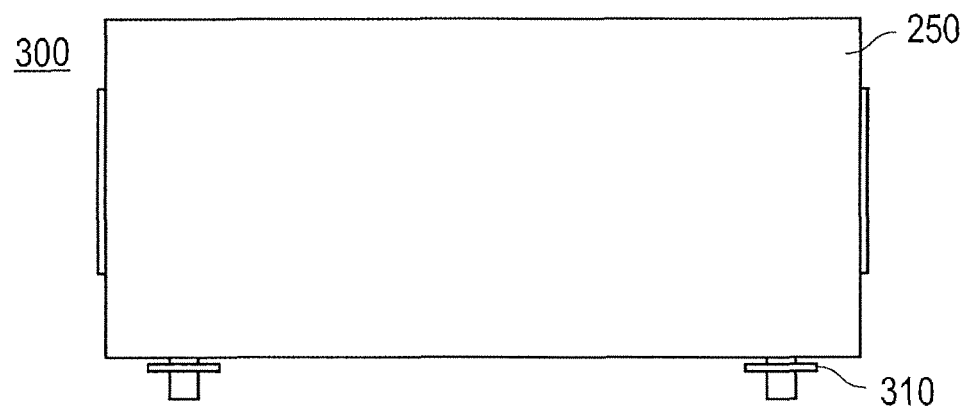
FIG. 3 is a plan view of a battery assembly according to one embodiment of the present invention.
Figure 4:
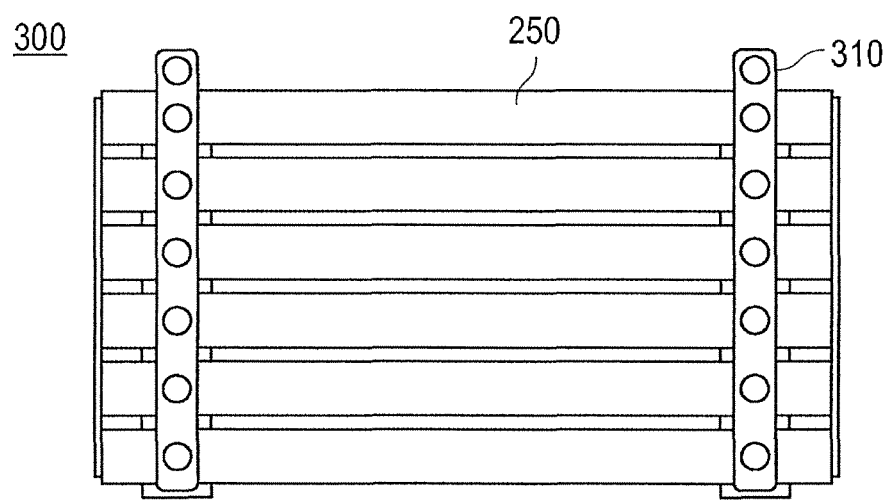
FIG. 4 is a front view of the battery assembly according to the one embodiment of the present invention.
Figure 5:
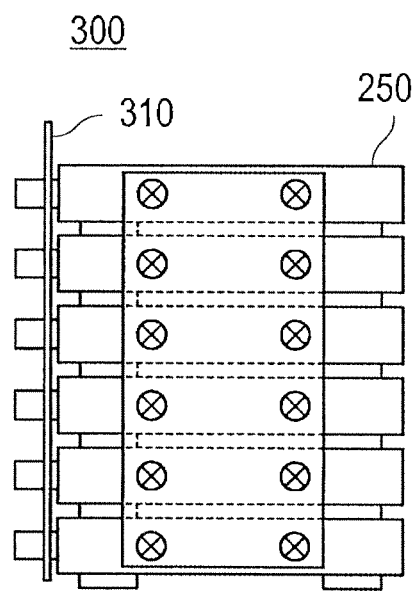
FIG. 5 is a side view of the battery assembly according to the one embodiment of the present invention.

FIGS. 3, 4 and 5 are a plan view, a front view and a side view showing the appearance of one example of battery assembly. As shown in FIGS. 3, 4 and 5, battery assembly 300 has a plurality of attachable/detachable small-size battery modules 250 electrically connected in series or in parallel. Each of battery modules 250 has a plurality of bipolar secondary batteries 10 electrically connected in series or in parallel. With such a configuration, battery assembly 300 can attain high capacity and good output characteristics suitable for use as a vehicle-driving power source or auxiliary power source where high volume energy density and high volume output density are required. Herein, battery modules 250 are electrically connected to each other via electrical connection means such as busbars and laminated in layers with the use of connection jig 310. The number of bipolar secondary batteries 10 in battery module 250 and the number of battery modules 250 in battery assembly 300 are determined depending on the battery capacity and output characteristics required of a vehicle (electric vehicle) on which battery assembly 300 is mounted.

[Vehicle]

Bipolar secondary battery 10 or the battery assembly in which a plurality of bipolar secondary batteries 10 are combined is suitable for use in a vehicle. In the present embodiment, bipolar secondary battery 10 has good long-term reliability, good output characteristics and long life and thus can be mounted on a plug-in hybrid electric vehicle that features a long EV driving distance or an electric vehicle that features a long driving distance on a single charge. In other words, bipolar secondary battery 10 or the battery assembly in which a plurality of bipolar secondary batteries 10 are combined can suitably be used as a power source of the vehicle. Examples of the vehicle are automotive vehicles such as hybrid electric vehicles, electric vehicles and fuel-cell vehicles. These automotive vehicles refer to not only four-wheel vehicles (passenger cars, commercial cars e.g. trucks and buses, light cars etc.) but also two-wheel vehicles (motorbikes etc.) and three-wheel vehicles. The application of bipolar secondary battery 10 or the battery assembly in which a plurality of bipolar secondary batteries 10 are combined is not limited to the above automotive vehicles. Bipolar secondary battery 10 or the battery assembly in which a plurality of bipolar secondary batteries 10 are combined can be applied as power sources for any other vehicles e.g. transportation means such as trains and as mountable/installable power supplies such as uninterruptible power supplies.

Figure 6:
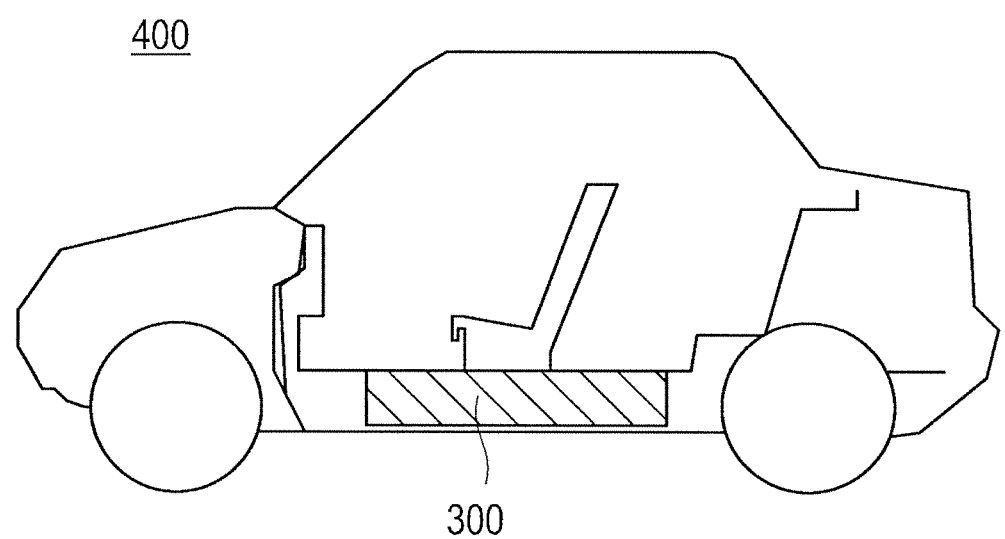
FIG. 6 is a schematic view of an automotive vehicle having mounted thereon the battery assembly according to the one embodiment of the present invention.

FIG. 6 is a schematic view showing electric vehicle 400 as one example of vehicle on which battery assembly 300 of FIGS. 3, 4 and 5 is mounted. As shown in FIG. 6, battery assembly 300 is mounted at a position under a seat in the center of a vehicle body of electric vehicle 400 so as to secure a wide vehicle interior space and trunk rooms. The mounting position of battery assembly 300 is not limited to the position under the seat. Battery assembly 300 may alternatively be mounted in a lower section of the rear trunk room or an engine room of the vehicle front side. Electric vehicle 400 with battery assembly 300 can attain high durability and ensure sufficient output during long-term use. The battery assembly can be used for a wide range of applications such as not only an electric vehicle as shown in FIG. 4 but also a hybrid electric vehicle and a fuel cell vehicle.

EXAMPLES

The present invention will be described in more detail below by way of the following examples. It is noted that these examples are only illustrative and not intended to limit the present invention thereto.

Production of Bipolar Electrodes

Example 1

A positive electrode active material paste was prepared by mixing 85 mass % of $LiMn_2O_4$ as a positive electrode active material, 5 mass % of acetylene black as a conduction aid, 10 mass % of polyvinylidene fluoride (PVdF) as a binder and an appropriate amount of N-methyl-2-pyrrolidone (NMP) as a slurry viscosity adjusting solvent. A negative electrode active material paste was prepared by mixing 85 mass % of $Li_4Ti_5O_{12}$ as a negative electrode active material, 5 mass % of acetylene black as a conduction aid, 10 mass % of polyvinylidene fluoride (PVdF) as a binder and an appropriate amount of N-methyl-2-pyrrolidone (NMP) as a slurry viscosity adjusting solvent. Further, a collector was provided in the form of a conductive resin layer (thickness: 30 µm, volume resistivity in thickness direction: $1\times10^{-2}$ Ω·cm) containing polyethylene as a base material and carbon particles (average particle size: 0.8 µm) as a conductive filler. A positive electrode active material layer was formed on one side of the collector by applying thereto and drying the positive electrode active material paste. Subsequently, a negative electrode active material layer was formed on the other side of the collector by applying thereto and drying the negative electrode active material paste. The thus-obtained laminate of the collector and the active material layers (hereinafter referred to as "composite electrode material") was subjected to hot roll pressing at a level that the active material layers did not break through the collector. The resulting composite electrode material was cut into a size of 140×90 mm, followed by removing the active material layers by a width of 10 mm around an outer peripheral portion of the composite electrode material. In this way, there were obtained bipolar electrodes in each of which the positive and negative electrode active material layers of 120×90 mm in size were formed on the opposite sides of the collector of 140×90 mm in size, with the outer periphery of the collector being exposed by a width of 10 mm as a seal margin.

Example 2

Bipolar electrodes were produced in the same manner as in Example 1, except for using polypropylene as the base material of the collectors.

Example 3

Bipolar electrodes were produced in the same manner as in Example 1, except for using polyimide as the base material of the collectors.

Comparative Example 1

Bipolar electrodes were produced in the same manner as in Example 1, except for using SUS foil films (thickness: 30 µm) as the collectors.

Production of Bipolar Secondary Battery

Examples 1 to 3

In each example, a porous film of 150×100 mm in size (pore size: 500 nm or smaller) was placed as a separator on the positive electrode active material layer of one of the above-obtained bipolar electrodes so as to cover the whole of one side of the bipolar electrode. The base material of the separator was as indicated in TABLE 1. Another one of the above-obtained bipolar electrodes was placed on the separator in such a manner that the negative electrode material layer of the another one bipolar electrode faced the separator. The above operations were repeated to form a laminate in which the bipolar electrodes, five in total, were laminated together via the separators. Three of four peripheral sides of the laminate were subjected to pressing (0.2 MPa, 160° C., 5 seconds) from both top and bottom sides, so as to fuse corresponding areas of the outer peripheries of the collectors and the separators together. An electrolytic solution (prepared by dissolving in a mixed solution of propylene carbonate:ethylene carbonate=1:1 (volume ratio) $LiPF_6$ at 1 mol/L) was charged into each of the separators from the remaining one peripheral side. The thus-obtained laminate was placed under vacuum in a vacuum chamber. In this state, the remaining one peripheral side of the laminate was subjected to pressing under the same conditions as above, so as to fuse remaining areas of the outer peripheries of the collectors and the separators together and thereby vacuum-seal the laminate. Thus obtained was a battery element in which the outer peripheral portions of the unit cells were sealed. Two aluminum plates of 130×80 mm in size (thickness: 100 µm) having electric lead terminals formed on portions thereof were provided as collector plates. The battery element was sandwiched between the collector plates and vacuum-sealed in an aluminum laminate film sheet so as to cover the battery element and the collector plates by the laminate film sheet. With this, a bipolar battery was completed.

Comparative Example 1

A polyethylene film of 12 mm in width was placed as a seal member on three sides of a positive-electrode-active-material-layer-side surface of the exposed outer periphery of the collector of one of the above-obtained bipolar electrodes. A porous film of 150×100 mm in size (base material: PE, pore size: 500 nm or smaller) was placed as a separator on the bipolar electrode and on the seal member. Then, a polyethylene film of 12 mm in width was placed as a seal member on three peripheral sides of the separator so as to correspond in position to the previously placed seal member. Another one of the above-obtained bipolar electrodes was placed in such a manner that the negative electrode material layer of the another one bipolar electrode faced the separator. The above operations were repeated to form a laminate in which the bipolar electrodes, five in total, were laminated together via the separators and the seal members. Three of four peripheral sides of the laminate were subjected to pressing (0.2 MPa, 160° C., 5 seconds) from both top and bottom sides so as to fuse corresponding areas of the outer peripheries of the collectors and the separators together by the seal members. An electrolytic solution (prepared by dissolving in a mixed solution of propylene carbonate:ethylene carbonate=1:1 (volume ratio) $LiPF_6$ at 1 mol/L) was charged into each of the separators from the remaining one peripheral side. The same seal member as above, two sheets of film per unit cell, was placed in the remaining one peripheral side of the laminate. The thus-obtained laminate was placed under vacuum in a vacuum chamber. In this state, the remaining one peripheral side of the laminate was subjected to pressing under the same conditions as above so as to fuse remaining areas of the outer peripheries of the collectors and the separators together and thereby vacuum-seal the laminate. Thus obtained was a battery element in which the outer peripheral portions of the unit cells were sealed. Two aluminum plates of 130×80 mm in size (thickness: 100 μm) having electric lead terminals formed on portions thereof were provided as collector plates. The battery element was sandwiched between the collector plates and vacuum-sealed in an aluminum laminate film sheet so as to cover the battery element and the collector plates by the laminate film sheet. With this, a bipolar battery was completed.

[Charge/Discharge Test]

Each of the bipolar secondary batteries was subjected to charge/discharge test. The charge/discharge test was conducted by repeating, in an atmosphere of 60° C., a charge/discharge cycle of charging the battery to 13.5 V in a constant-current system (CC, current: 1C), leaving the battery at rest for 10 minutes, discharging the battery to 7.5 V in a constant-current system (CC, current: 1C) and leaving the battery at rest for 10 minutes. The seal durability of the seal portion of the unit cell was then evaluated. The evaluation results were are indicated below in TABLE 1.

TABLE 1

| | Seal means | | |
|---|---|---|---|
| | Collector base material | Separator base material | | Seal durability |
| Example 1 | PE | PE | Thermal fusion | No solution leakage even after 1000 cycles |
| Example 2 | PP | PP | bonding of collectors and separator | No solution leakage even after 1000 cycles |
| Example 3 | PI | PI | | No solution leakage even after 1000 cycles |
| Comparative Example 1 | Thermal fusion bonding of collectors (PE) and separator (PE) via seal member (PE) | | | Solution leakage after 500 cycles |

PE: Polyethylene
PP: Polypropylene
PI: Polyimide

The bipolar secondary battery of Comparative Example 1 had a significant drop in voltage and became incapable of charge/discharge cycle operation at a point exceeding 500 test cycles. It was found as a result of examination of the battery inside that there occurred leakage of the electrolytic solution from the unit cell due to insufficient bonding of the seal portion in the battery. On the other hand, each of the bipolar secondary batteries of Examples 1 to 3 was able to maintain its voltage, with no leakage of the electrolytic solution observed in the seal portion, even after 1000 test cycles.

[Microscopic Analysis]

Figure 7:
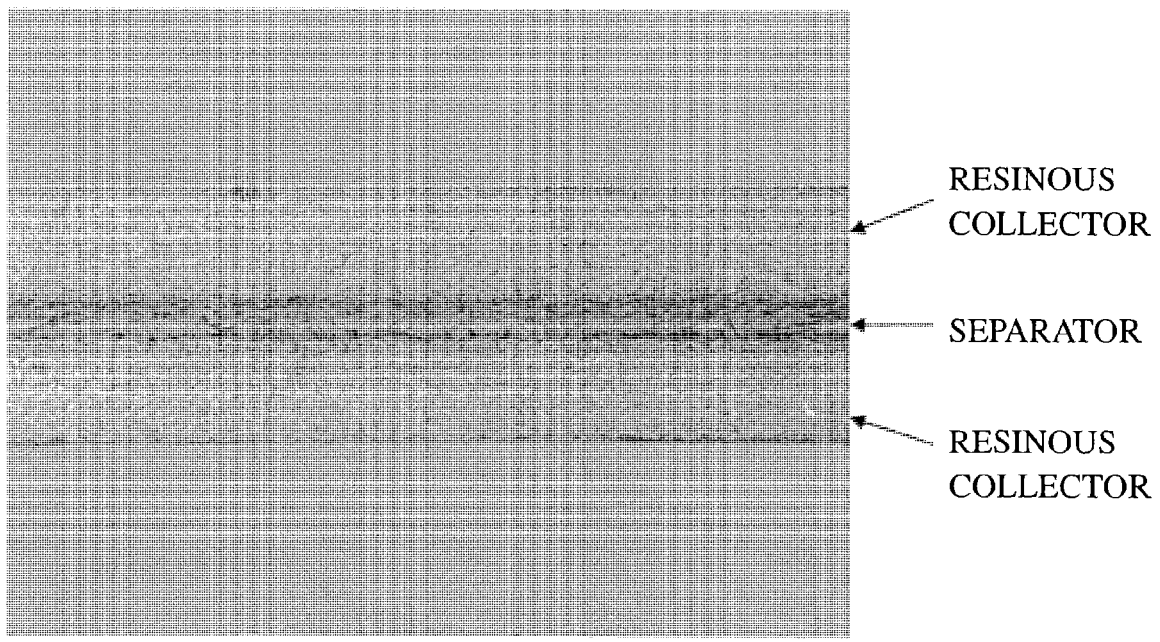
FIG. 7 is an electron micrograph showing a section of a heat seal portion in a bipolar secondary battery of Example 1.

The thermally fused portion (seal portion) of each of the bipolar secondary batteries of Examples 1-3 was observed by an electron microscope. By way of example, FIG. 7 shows an electron micrograph of the cross section of the thermally fused portion of the bipolar secondary battery of Example 1. As shown in FIG. 7, the resin base material of the collector was embedded into the pores of the porous film separator so that the resin molecule of the corrector and the resin molecule of the separator were bonded and cured together. There was no interface formed between the collector and the separator in the thermally fused portion of the bipolar secondary battery.

In Examples 2 and 3, the resin base material of the collector was also embedded into and cured within the pores of the porous film separator in the same manner as in Example 1.

It has been confirmed by the above results that it is possible according to the present invention to provide the bipolar secondary battery in which the seal means for the unit cell exhibits good seal durability under by the effect of anchoring the collector base resin to the separator.

The invention claimed is:

1. A bipolar secondary battery, comprising: a battery element, the battery element comprising:
   first and second bipolar electrodes, each of the first and second bipolar electrodes having a collector disposed with a conductive resin layer, a positive electrode active material layer formed on one side of the collector and a negative electrode active material layer formed on the other side of the collector, the conductive resin layer containing a first resin as a base material; and
   a separator arranged between the first and second bipolar electrodes and retaining therein an electrolyte material to form an electrolyte layer, the separator containing a second resin as a base material;
   the positive electrode active material layer of the first bipolar electrode, the electrolyte layer and the negative electrode active material layer of the second bipolar electrode constituting a unit cell,
   wherein a melting point of the first resin is lower than or equal to a melting point of the second resin; and
   wherein outer peripheries of the collectors of the first and second bipolar electrodes and an outer periphery of the separator are fused together to thereby seal an outer peripheral portion of the unit cell.

2. The bipolar secondary battery according to claim 1, wherein the first resin contains either polyethylene or polypropylene; and wherein the second resin contains at least one kind selected from the group consisting of polyethylene, polypropylene, polyethylene terephthalate, polyether nitrile, polyimide, polyamide and polyvinylidene fluoride.

3. The bipolar secondary battery according to claim 1, wherein the second resin is a thermosetting resin.

4. The bipolar secondary battery according to claim 1, wherein the conductive resin layer contains a conductive filler; and wherein a particle size of the conductive filler is larger than a pore size of the separator.

5. The bipolar secondary battery according to claim 1, wherein the bipolar secondary battery is a lithium-ion secondary battery.

6. A bipolar secondary battery, comprising: a battery element, the battery element comprising:
   first and second bipolar electrodes, each of the first and second bipolar electrodes having a collector disposed with a conductive resin layer, a positive electrode active material layer formed on one side of the collector and a negative electrode active material layer formed on the other side of the collector, the conductive resin layer containing a first resin as a base material; and
   a separator arranged between the first and second bipolar electrodes and retaining therein an electrolyte material to form an electrolyte layer, the separator containing a second resin as a base material;
   the positive electrode active material layer of the first bipolar electrode, the electrolyte layer and the negative electrode active material layer of the second bipolar electrode constituting a unit cell,
   wherein a melting point of the first resin is lower than or equal to a melting point of the second resin; and wherein the first resin of outer peripheries of the collectors of the first and second bipolar electrodes and the second resin of an outer periphery of the separator are bonded together by intermolecular force to thereby seal an outer peripheral portion of the unit cell.

7. A production method of a bipolar secondary battery, comprising:

preparing first and second bipolar electrodes, each of the first and second electrode having a collector disposed with a conductive resin layer containing a first resin as a base material, a positive electrode active material layer formed on one side of the collector and a negative electrode active material layer formed on the other side of the collector;

preparing a separator containing a second resin as a base material;

laminating the first and second bipolar electrodes on the separator in such a manner that the positive electrode active material layer of the first bipolar electrode faces the negative electrode active material layer of the second bipolar electrode via the separator;

charging an electrolyte material into the separator to form an electrolyte layer so that the positive electrode active material layer of the first bipolar electrode, the electrolyte layer and the negative electrode active material layer of the second bipolar electrode constitute a unit cell; and hot pressing an outer peripheral portion of the unit cell, thereby fusing outer peripheries of the collectors of the first and second bipolar electrodes to an outer periphery of the separator, wherein a melting point of the first resin is lower than or equal to a melting point of the second resin.

8. The production method of the bipolar secondary battery according to claim 7, wherein the holt pressing includes hot pressing all sides other than one side of the outer peripheral portion of the unit cell so as to fuse corresponding areas of the outer peripheries of the collectors of the first and second bipolar electrodes and of the separator together.

9. The production method of the bipolar secondary battery according to claim 8, wherein the holt pressing includes, after charging the electrolyte material into the separator, hot pressing the one side of the outer peripheral portion of the unit cell so as to fuse remaining areas of the outer peripheries of the collectors of the first and second bipolar electrodes and of the separator together.

* * * * *